Jan. 6, 1970  H. O. McINTIRE ET AL  3,488,575
FERROMAGNETIC BALL MAGNETIZER AND REMANENCE DETECTOR
Filed June 23, 1967  2 Sheets-Sheet 1
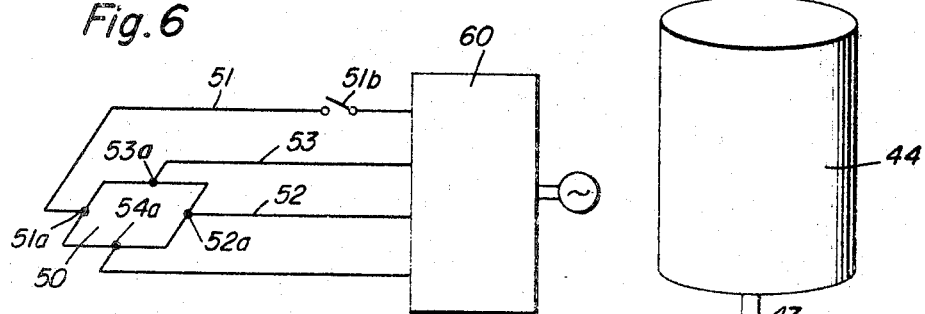
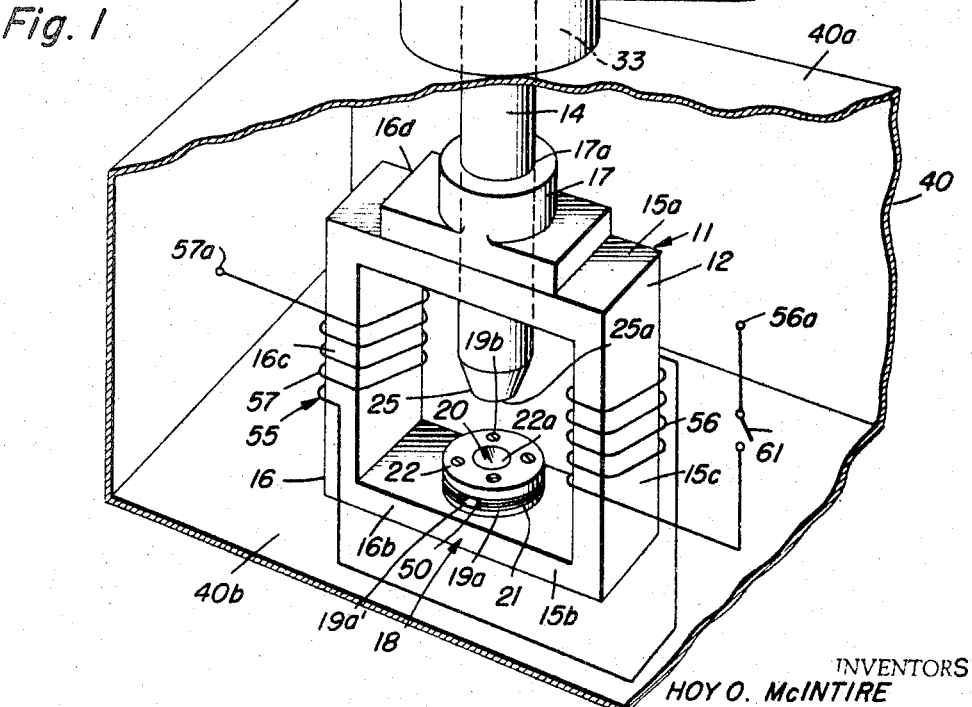
INVENTORS
HOY O. McINTIRE
HARVEY H. HUNTER
CLIFFORD L. SEALE
JOHN H. FLORA
BY John B. _____
ATTORNEY

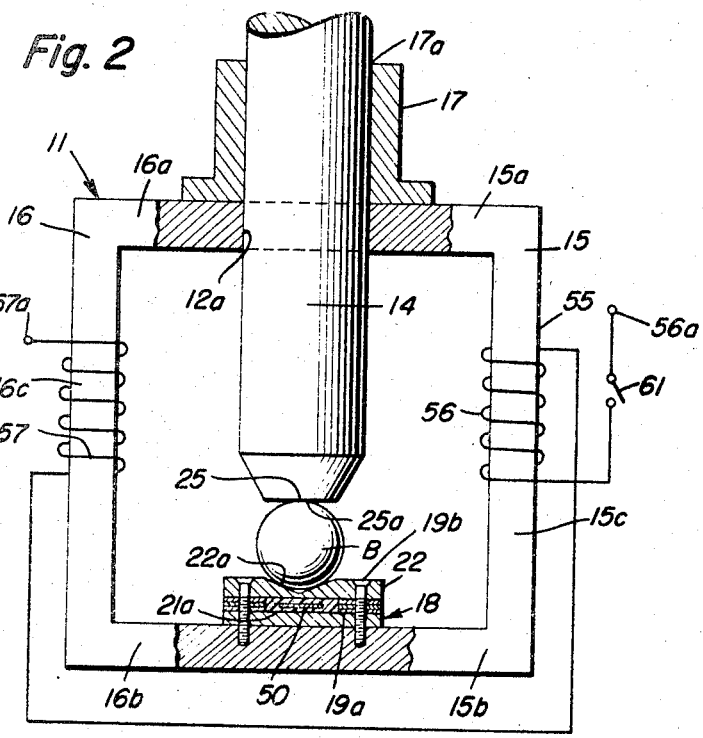
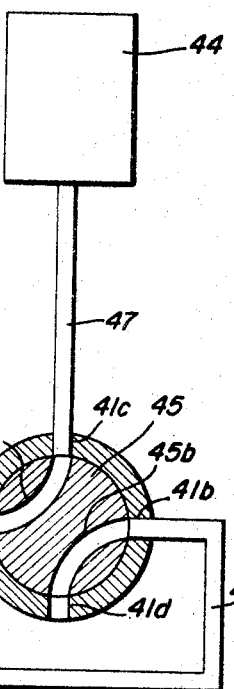
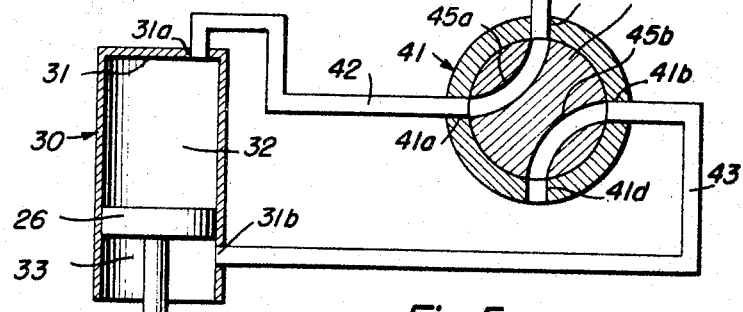
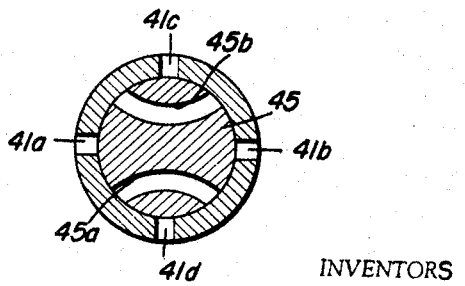
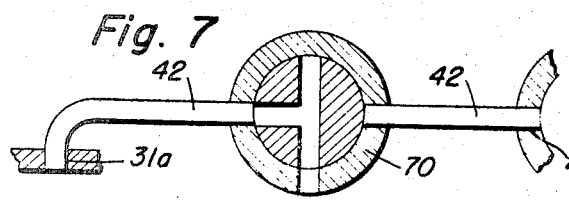

United States Patent Office 3,488,575
Patented Jan. 6, 1970

3,488,575
FERROMAGNETIC BALL MAGNETIZER AND REMANENCE DETECTOR
Hoy O. McIntire, Harvey H. Hunter, Clifford L. Seale, and John H. Flora, all of Battelle Memorial Institute, 505 King Ave., Columbus, Ohio 53201
Filed June 23, 1967, Ser. No. 648,378
Int. Cl. G01r 33/02
U.S. Cl. 324—34                                                  9 Claims

ABSTRACT OF THE DISCLOSURE

Apparatus is provided for magnetizing a ferromagnetic ball and producing an output voltage inclusive of a voltage value which is proportional to residual magnetic flux in the ball. The magnetization is achieved in a magnetic circuit utilizing a core in association with a magnetizing winding, and there is a residual flux detector, the latter being arranged to sense field strength on electrical energization ensuing upon electrical deenergization of the magnetizing winding and on the field strength sensed to produce an output voltage from which residual flux in a magnetized ferromagnetic ball in the magnetic circuit can be interpreted. The apparatus accommodates a ferromagnetic ball of any of different sizes in an indexed location in the magnetic circuit, and magnetic poles of the core enable a ferromagnetic ball to be in the magnetic circuit having the poles at closest adjacency to separate coaxial regions of opposed hemispheres of the ball for the ball to be magnetized and residual flux in the ball to be detected.

BACKGROUND OF THE INVENTION

The present invention is concerned with electro-magnetic testing, and relates more particularly to electromagnetic apparatus for producing residual magnetic flux in ferromagnetic balls and having an output voltage which includes a function that is proportional to residual flux in the ball.

Residual flux is the residual magnetic force in a ferromagnetic body after a magnetizing influence upon the body has been exerted and discontinued. Where like ferromagnetic material is magnetized to a given level of magnetization, the ensuing residual flux in the material has a relationship to other properties of the material among which is hardness of the material; the greater the residual flux the higher the hardness. Ferromagnetic balls of course fall into many different categories, one of which includes steel balls for use in grinding a mill charge on the well known ball milling principle. It is an accepted practice to manufacture mill balls by size and by like process, using the same ferromagnetic material. The size from lot to lot therefore may differ while the balls belonging to each lot are kept within reasonably close tolerances on size. Under these and other circumstances it often becomes important to test manufactured ferromagnetic balls of various sizes for hardness.

Apparatus in accordance with the present invention lends itself to operation under standardization of the manner in which residual flux is produced in ferromagnetic balls of any of different sizes and detected. Typically, a core of the apparatus includes a first core portion and a plunger. The first magnetic core portion regionally has a first pole of the core and the first magnetic pole forms an indexing seat for seating a ferromagnetic ball of any of different classes as to size in an indexed location, and the plunger is movably connected with the aforementioned first core portion and has an end forming a second magnetic pole of the core for the plunger end moved with the plunger to place a ferromagnetic ball in contact therewith and seated on the seat of the first core portion in a magnetic circuit with the core, having the seat and the plunger end in closest adjacency to the ferromagnetic ball at separate coaxial regions of opposed hemispheres of the ball. A magnetizing winding on the core is arranged for inducing magnetic flux in the magnetic circuit upon being electrically energized and there to be residual flux in a ferromagnetic ball in the magnetic circuit upon the winding being electrically deenergized. A residual flux detector, preferably a Hall effect device, is arranged with the core, having input terminals for producing electrically energized at the input terminals an output voltage at the output terminals inclusive of a voltage value which is proportional to residual flux in a ferromagnetic ball in the magnetic circuit.

IDENTIFICATION OF THE DRAWINGS

While the specification concludes with claims particularly pointing out and distinctly claiming the subject matter which we regard as our invention, it is believed that the invention will be better understood from the following description with reference to an illustrative embodiment thereof represented in the following drawings in which:

FIGURE 1 is a perspective view, partially broken away, of an electromagnetic apparatus for ferromagnetic balls to be magnetized and produce a discerned residual magnetic flux;

FIGURE 2 is an elevation partially in section representing portions of the apparatus of FIGURE 1, and more particularly indicating the magnetic poles in a magnetic circuit closing position with a ball;

FIGURE 3 is a schematic diagram of valve controlled power equipment associated with the plunger of the apparatus of the preceding figures of the drawings;

FIGURE 4 represents the valve of FIGURE 3 in a further control position;

FIGURE 5 shows the valve of FIGURES 3 and 4 in a closed position;

FIGURE 6 is a diagrammatic representation of a residual flux detector of the apparatus of FIGURES 1 and 2, the detector being connected with a gaussmeter; and FIGURE 7 represents an auxiliary valve and connection detail whereby the controlled power equipment of FIGURE 3 is modified.

Referring now more particularly to the accompanying drawing, the electromagnetic apparatus 10 includes a magnetic core 11 which is characterized by having first magnetic core means, the latter comprising a generally rectangular frame 12 and the base 21 of a projection 18, and by having a first magnetic pole 22 which provides an indexing magnetic seat 22a. Furthermore, core 11 includes a magnetically conductive plunger 14. Two opposed approximate halves 15 and 16 of the core frame 12 open toward each other, are in different branches of the magnetic flux path afforded their opposed first portions 15a and 16a integral with each other and joined with mounting 17 for the plunger 14 outside the core frame and having their opposed second portions 15b and 16b integral with each other and joined with the core projection 18 which is disposed inside the core frame. The opposed sides 15c and 16c of the frame halves interconnect the other opposed sides of the frame which accordingly respectively include the opposed first portions 15a and 16a of the frame halves and the opposed second portions 15b and 16b of the frame halves. The projection 18 externally is generally cylindrical, extends toward the plunger mounting 17, and endwise forms annularly disposed magnetic contact structure referred to hereinbefore as the indexing seat 22a for the first magnetic pole 22 to seat a ferromagnetic ball of any of different classes as to size inside the boundary of the core frame 12. Accordingly the indexing seat 22a on the entrant side has a conical rim face bordering a conical opening 20 in the end of the pole, the conical opening being coaxial with the projection 18.

The plunger 14 has a truncated conical first end 25 forming a second magnetic pole of the core 11, and the end face 25a of this pole is substantially planar and perpendicular to the axis of the plunger, face 25a accordingly being circular at the outer perimeter. Extending rearwardly from magnetic pole 25 the plunger 14 is externally cylindrical on the axis of the pole and is received longitudinally axially movably and guidedly conformably in opening 12a in the frame 12 and in opening 17a formed in the mounting 17. The first magnetic core means, referred to hereinbefore, accordingly has a magnetic terminal in frame 12 adjacent to the opening 12a and plunger 14, and has another magnetic terminal represented by base 21 of the projection 18. As thus supported, the plunger 14 is substantially coaxial with the seat 22a of the first magnetic pole 22 and when longitudinally moved maintains this coaxial relationship for the end face 25a geometrically to contact and place equivalently any ferromagnetic ball B (see FIGURE 2) of like size selected from different classes as to size, and seated on the seat 22a, in a magnetic circuit with the core 11 having the poles 22 and 25 in closest adjacency to the ferromagnetic ball at separate coaxial regions of opposed hemispheres of the ball.

Apparatus 10, moreover, includes having the plunger 14 arranged with power-operated means 30 controlled for moving the plunger to a retracted position wherein the pole end face 25a of the plunger no longer contacts a ferromagnetic ball seated on the seat 22a and for the plunger to move from the retracted position into contact at the pole end face 25a with a ferromagnetic ball seated on the seat and apply seating thrust to the seated ball. More particularly, the plunger 14 has a piston 26 at an end opposing the pole end of the plunger and the power-operated means 30 includes this piston and a cylinder 31 which forms respectively a first chamber 32 and a second chamber 33 with the piston for a partition. Cylinder 31 is securely mounted on a cabinet 40, through the top wall 40a of which the plunger 14 extends, while the core 11 and the related pole end of the plunger are inside the cabinet with the core 11 securely mounted on base 40b of the cabinet.

There are ports 31a and 31b through the wall of cylinder 31 (see FIGURE 3) which communicate respectively with the chambers 32 and 33. Thrust within the cylinder 31 is transmitted to the piston 26 on fluid operation and for this purpose ports 31a and 31b communicate through pipe lines 42 and 43 with control ports 41a and 41b in the wall of a reversing valve 41. A suitable source 44 of pressurized fluid, such as air, has an outlet line 47 connected with an inlet port 41c through the wall of the valve, and a port 41d through this same wall empties to exhaust. A rotary mechanical core 45 of the valve is suitably sealed against the inside surface of the wall of the valve and has two arcuate passages 45a and 45b. Valve 41 has a control handle 41e (see FIGURE 1) for the valve core 45 to be rotated selectively to a first position, a second position, and an off position. In the first position of the valve core, passage 45a interconnects ports 41a and 41c, and passage 45b interconnects ports 41b and 41d, as will be seen on referring to FIGURE 3. The second position of the valve core, represented in FIGURE 4, entails having the passage 45a in intercommunication with ports 41a and 41d and passage 45b in intercommunication with ports 41b and 41c. In the off position, indicated in FIGURE 5, the valve core 45 is closed off at port 41c from the fluid supply, the other ports 41a, 41b and 41d also being closed.

Considering still further the magnetic core 11, base 21 of the projection 18, and pole 22, are made of low coercive force material such as Armco ingot iron and so are the core frame 12 and the plunger 14. The plunger mounting 17 advantageously is made of non-magnetic substance such as brass. Base 21 and pole 22 are spaced apart axially of the projection 18 and are secured together by nonmagnetic interconnector means in this offset relation to provide a magnetically inert region in the core throughout a full transverse section of the projection 18. The offset of pole 22 from base 21 of the projection is established in the present embodiment by having the nonmagnetic interconnector include a stack of magnetically inert split washers 19a disposed between the margins of the adjacent ends of base 21 and pole 22. The splits in the washers register (see FIGURE 1) to form a way 19a' radially into compartment 21a shown between the base 21 and the pole 22 in FIGURE 2. Magnetically inert screws 19b of the non-magnetic interconnector means are associated with threads in the core frame 12 and extend through holes in each base 21, washers 19a and pole 22 to fix the projection 18 to the core frame. The washers 19a and screws 19b illustratively are made of brass.

The magnetic core 11 carries a residual flux detector in the form of a Hall effect device 50 (see FIGURES 1 and 2) which comprises a wafer received within compartment 21a inside the projection 18 and therefore at a location rearwardly of and proximate to the seat 22a of magnetic pole 22. The Hall effect device is for example of the BH200 type manufactured by F. W. Bell, Incorporated, of Columbus, Ohio, this being a thin rectangular wafer of high purity indium arsenide. A first pair of electrical leads 51 and 52 (see FIGURE 6) attached respectively at input terminals 51a and 52a on the opposite shorter sides of the wafer and a second pair of leads 53 and 54 connected respectively at output terminals 53a and 54a on the opposite longer sides of the wafer extend through opening 19a' in the core projection 18. The wafer in the compartment 21a intersects the magnetic flux path afforded in the longitudinal axial direction by the projection 18 and is suitably non-magnetically fixed in this position to the core 11, as by potting through use of an epoxy compound for the purpose, having the lonitudinal axis of the projection 18 about perpendicular to the plane of the wafer or having the plane of the wafer otherwise within the brunt of the flux path just mentioned. It is preferred that the wafer be located about parallel to a plane having a circle on the inner perimeter of the conical seat 22a therein.

By having leads 51 and 52, and therefore the terminals 51a and 52a, connected with a source of an electrical control current, the control current passes through the long dimension of the wafer, and a voltage which is directly proportional to the control current and the magnitude of the flux vector which is at right angles to the plane of the wafer appears across the output terminals 53a and 54a. Residual flux in a ferromagnetic ball on seat 22, in view of the position of the wafer within the projection 18, has a flux vector which is normal to the plane of the wafer, and through controlling the manner in which the wafer is electrically energized at the input terminals 51a and 52a to have the control current represent a constant, the output voltage across terminals 53a and 54a, includes a voltage value which is proportional to residual flux in a ferromagnetic ball in the magnetic circuit of the apparatus 10.

A gaussmeter 60 is readily used with the apparatus 10 to indicate the magnitude of the output voltage of the residual flux detector in terms of gauss, and as shown by the leads 51, 52, 53 and 54 in FIGURE 6, the gaussmeter is for example of a type operating on a 117 volt alternating current electrical supply for feeding a control current representing a constant to the wafer and giving a measure of the output voltage of the wafer in terms of gauss. A suitable gaussmeter of the latter type is Model 120 manufactured by F. W. Bell, Incorporated, of Columbus, Ohio. Lead 51 includes a switch 51b for the circuit including terminals 51a and 52a to be opened or closed.

A magnetizing winding, designated in general in FIGURES 1 and 2 by the reference numeral 55, is provided including the electrically series connected coils 56 and 57 respectively surrounding the opposed sides 15c and 16c of the core frame 12. Therefore, a unit is had which includes winding 55, frame 12, projection 18 and the Hall effect device 50, which unit is associated with plunger 14 relatively movably in view of the mounting 17, and magnetically conductively in view of the proximity of plunger 14 in the opening 12a to frame 12. The coils 56 and 57 are wound in directions to induce a magnetomotive force in directions which oppose in the portions 15a and 16a of the frame halves 15 and 16 and in directions which also oppose in portions 15b and 16b of these halves, for flux additively to pass through the projection 18 and plunger 14. There are terminals 56a and 57a, one corresponding to each of the electrically series connected coils 56 and 57. For electrically energizing the magnetizing winding 55 the terminals 56a and 57a are connected with a source of direct current electrical supply. The number of turns in the magnetizing winding 55 and the electrical current supplied across the terminals 56a and 57a are arranged having the number of turns in the coils 56 and 57 about equal, for the core 11 in magnetic circuit with a ferromagnetic ball to receive from the winding an induced magnetic flux in the magnetic poles 22 and 25. In the electrical circuit connecting the magnetizing winding 55 with a source of direct current supply there is conveniently an on-off supply switch 61 for this circuit to be opened and closed. Preferably, the electrical supply to the winding 55 is a pulsating direct current supply having a substantially constant pulsation rate of anywhere from about 20 to about 30 pulses per minute while a ferromagnetic ball is being magnetized in the apparatus 10. Certain ferromagnetic materials are notoriously difficult to magnetize and this difficulty usually increases with the actual physical hardness of the ferromagnetic material. The use of the aforementioned pulsation rate in the electrical supply to the winding 55 promotes more favorable reproducibility of test results, and lends ease to magnetizing a ferromagnetic ball particularly where the ferromagnetic material of the ball includes one of those materials which ordinarily is quite difficult to magnetize.

By rotating the core 45 of valve 41 to the aforementioned second position represented in FIGURE 4, fluid under pressure from the source of supply 44 passes through outlet line 47 and thence through passage 45b and the pipe line 43 into chamber 33. This actuates the piston 26, and plunger 14 accordingly is moved with reference to the magnetic pole 22 to a fully retracted position represented by piston 26 being in abutting contact with the outer end wall of cylinder 31 and held in that relation to the cylinder by pressure of the fluid in chamber 33. During movement of the plunger 14 fluid displaced from chamber 32 by the piston 26 has egress through pipe line 42 and the passage 45a, and is exhausted through port 41d. Assuming now that the switch 61 is open therefore having the magnetizing winding 55 electrically deenergized, and assuming further that the gaussmeter 60 is electrically energized having the switch 51b in the lead 51 closed, the gaussmeter provides a control current which correlates as a constant with reference to voltage appearing across the output terminals 53a and 54a of the Hall effect device 50. During use of the apparatus 10, residual magnetic flux may occur as a variable in core 11 and to compensate for this variable in the test results the gaussmeter 60 is advantageously zeroed while having the plunger 14 set to a reference position each time before a ferromagnetic ball is introduced on the seat 22a for testing. The zeroing is accomplished while having the Hall effect device energized and the magnetizing winding deenergized. One of the reference positions of the plunger 14 which may be used for the zeroing is the fully retracted position. Otherwise the reference position may for example be equivalent to that to be occupied by the plunger when in contact with a ferromagnetic ball on the seat. This setting suitably is accomplished by placing on seat 22a of the magnetic pole 22, a magnetically inert ball such as of wood, of the same size as a ferromagnetic ball which is to be tested. Then, by setting the valve 41 to the aforementioned first position of the core 45 thereof, shown in FIGURE 3, fluid under pressure from source 44 is supplied through outlet line 47, passage 45a and pipe line 42 to the chamber 32, while the chamber 33 is open through pipe line 43, passage 45b and thence through the exhaust port 41d. Under the fluid pressure exerted in chamber 32 upon piston 26, the plunger 14 moves toward the magnetic pole 22 and is stopped by the magnetically inert ball on seat 22a. Under the pressure transmitted within chamber 32 to the plunger, the plunger clamps the magnetically inert ball to the seat and during this time, with the magnetizing winding 55 deenergized through having the switch 61 open and with the Hall effect device 50 energized through having switch 51b closed, a reading is taken from the gaussmeter 60 or the gaussmeter otherwise is in effect zeroed to compensate for inherent magnetism of the apparatus 10 determined from the voltage then across the terminals 53a and 54a.

The magnetically inert ball on the seat 22a is replaced by a ferromagnetic ball of like size after valve 41 is reset to the FIGURE 4 position to have the plunger 14 retracted. Valve 41 then is returned to the FIGURE 3 position and the plunger under pressure of fluid in the chamber 32 clamps the ferromagnetic ball to the seat 22a and establishes a fixed position of the ferromagnetic ball in the magnetic circuit with core 11. With switch 61 closed, the magnetizing winding 55 becomes electrically energized and induces magnetic flux in the magnetic circuit. The flux from the coils 56 and 57 is additive at the poles 22 and 25 and the ferromagnetic ball becomes magnetized. During this time the Hall effect device 50 advantageously remains electrically energized across the input terminals 51a and 52a for the gaussmeter 60 to detect peak magnetization of the ferromagnetic ball, following which the switch 61 is opened to deenergize the magnetizing winding. With the Hall effect device electrically energized across the input terminals 51a and 52a, the voltage across the output terminals 53a and 54a then is inclusive of a voltage value which is proportional to residual flux in the magnetized ball and is detected by the gaussmeter 60.

Considering that the apparatus 10 has been zeroed out for inherent magnetism in the apparatus 10, a reading in gauss obtained from the gaussmeter may be interpreted in terms of residual flux in the ball. These gauss readings sometimes are availed upon for comparing the hardnesses of ferromagnetic balls, having the readings inclusive of a function of hardness, such as average hardness of the ball as an entity or average hardness of a region or regions of the ball.

During the magnetization of the ball, and the ensuing reading of the gaussmeter for the residual flux determination, it is quite important that the ball be kept in fixed position relative to the magnetic poles 22 and 25, for otherwise errors accrue from movement. Of course the same test may be repeated on a given ferromagnetic ball through use of the apparatus 10, illustratively for an average of the results of the several tests thereafter to be computed. In these practices different regions of the ball, each centered about 90° apart may for example be brought, one for each test, into contact with the seat 22a and be maintained clamped there under thrust of the plunger 14 throughout the test.

An illustration of details in accordance with the present invention is had through considering the instance where the pole end face 25a of the plunger 14 and the diameter of the projection 21 were made respectively to about 1.5 inches and approximately 3.5 inches, having these dimensions affiliated with 210 turns of #14 wire in each of the coils 56 and 57 and a direct current of 20 amperes pulsating at a constant rate of anywhere from about 20 to 30 pulses per minute for energizing the magnetizing winding 55. Under these conditions, ferromagnetic balls of various diameters within the range of 0.5 inch to 4.0 inches were tested each at different times in contact with the magnetic poles 21 and 35. While the air gaps at these poles varied with size of the ball, a sufficient level of magnetic flux was reached in the balls for the measurement purpose.

In certain embodiments also in accordance with the present invention power operation of the plunger is omitted, and in other embodiments power operation is modified to apply primarily to the retraction stroke of the plunger and for the plunger to be controlled to move under force of gravity into contact with a ferromagnetic ball seated on the seat, thus closing the magnetic circuit. A typical such latter arrangement will be readily understood with reference to FIGURE 7 representing an auxiliary vent valve 70 which modifies the fluid pressure system of FIGURE 3 by being a component of the interconnection 42 between the valve 41 and the cylinder 31, either to have a position permitting power operation of the plunger 14 as hereinbefore described or to have the FIGURE 7 position to alter the latter form of power operation to a power retraction stroke of the plunger 14 for the FIGURE 4 poistion of the valve 41 and maintain the chamber 32 vented by way of port 31a to atmosphere at all times. Thus, when the valve 41 is in the FIGURE 3 position, plunger 14 simply descends from the fully retracted position by gravity into contact with a ferromagnetic ball on the seat 22a and maintains this contact under its own weight while the ball is being magnetized.

While considerable emphasis has been placed upon use of the apparatus of this invention for testing ferromagnetic balls it will clearly be understood that the apparatus also may have utility for testing magnetic materials in other forms than balls.

As many possible embodiments of the invention may be made and as many possible changes may be made in the embodiments hereinbefore set forth, it will be distinctly understood that all matter described herein is to be interpreted as illustrative and not as a limitation.

We claim:

1. Magnetizing and residual magnetic flux sensitive apparatus comprising, magnetically conductive plunger means having a magnetic contact end; and a unit mechanically and magnetically connected with said magnetically conductive plunger means, said unit including, an indexing magnetic seat comprising annularly disposed magnetic contact structure about an entrant center of said seat for a ferromagnetic ball of any of different classes as to ball size entering said center to index to a position on said magnetic contact structure according to ball size, magnetic core means having first and second magnetic terminals, non-magnetic inter-connector means extending in a non-magnetic zone between said magnetic contact structure and said magnetic core means and interconnecting said magnetic contact structure with said first magnetic terminal of said magnetic core means through said non-magnetic zone, placing said non-magnetic zone in a magnetic flux path with said magnetic contact structure and said magnetic core means, a magnetizing winding on said magnetic core means for inducing magnetic flux in said magnetic flux path, and a Hall effect wafer extending in said non-magnetic zone and being in a fixed position with reference to said magnetic contact structure for sensing residual magnetic flux in said magnetic flux path, said unit and said magnetically conductive plunger means being relatively movably connected at said second magnetic terminal for being relatively moved longitudinally of said magnetically conductive plunger means while having said magnetically conductive plunger means substantially coaxial with said magnetic contact structure and having said magnetic contact end opposite said magnetic contact structure to produce any one of a number of geometrical, substantially equivalently restorable, interrelations of said magnetic contact end with reference to said magnetic contact structure and said Hall effect wafer, whereby a magnetizing circuit to be energized by said magnetizing winding and having said Hall effect wafer present for sensing residual magnetic flux is had by placing a ferromagnetic ball of any of different classes as to ball size in indexed position on said magnetic contact structure and in contact with said magnetic contact end, with the resulting said interrelation of said magnetic contact end with reference to said magnetic contact structure and said Hall effect wafer differing with ball size and being substantially equivalently restored by having a subsequent ball of the same size as before accommodated on said magnetic contact structure and against said magnetic contact end.

2. Magnetizing and residual magnetic flux sensitive apparatus as set forth in claim 1 having said axis of said magnetic contact structure extended through said non-magnetic zone wherein said Hall effect wafer is in said magnetic flux path.

3. Magnetizing and residual magnetic flux sensitive apparatus as set forth in claim 1 wherein said magnetic core means includes a pair of magnetically conductive interconnecting core means each magnetically conductively interconnecting said first and second magnetic terminals in a different branch of said magnetic flux path, and said magnetizing winding includes a pair of magnetizing coils magnetically inductively on one and the other of said pair of magnetically conductive interconnecting core means, said pair of coils being wound and electrically interconnected for the magnetomotive forces induced thereby in said pair of magnetically conductive core means to be aiding in each of said first and second magnetic terminals.

4. Magnetizing and residual magnetic flux sensitive apparatus as set forth in claim 3 having said axis of said magnetic contact structure extend through said non-magnetic zone wherein said Hall effect wafer is in said magnetic flux path.

5. Magnetizing and residual magnetic flux sensitive apparatus as set forth in claim 1 wherein a face of said magnetic contact structure is substantially continuously circular for contacting and indexing a ferromagnetic ball, and said magnetic contact end of said magnetically conductive plunger means has a substantially plane contact face toward said substantially continuously circular face of said magnetic contact structure.

6. Magnetizing and residual magnetic flux sensitive apparatus as set forth in claim 1 including power-operated and control means connected with said plunger means for controlling direction of movement of said magnetically conductive plunger means on said axis of said magnetically conductive plunger means and varying on power operation the distance of said magnetic contact end from said magnetic contact structure, and said axis of said magnetically conductive plunger means extends through said non-magnetic zone wherein said Hall effect wafer is in said magnetic flux path.

7. Magnetizing and residual magnetic flux sensitive apparatus as set forth in claim 1 wherein power-operated means controlled for selectively being energized or isolated from a source of power, and said magnetically conductive plunger means normally having said axis thereof substantially vertical in the apparatus, are connected, for said magnetically conductive plunger means to move in a forward direction on said axis thereof and advance said magnetic contact end toward said magnetic contact structure on gravity operation having said power-operated means isolated from said source of power, and for said power-operated means energized from said source of power to drive said magnetically conductive plunger means in a reverse direction on said axis thereof.

8. Magnetizing and residual magnetic flux sensitive apparatus as set forth in claim 3 wherein power-operated means controlled for selectively being energized or isolated from a source of power, and said magnetically conductive plunger means normally having said axis thereof substantially vertical in the apparatus, are connected, for said magnetically conductive plunger means to move in a forward direction on said axis thereof and advance said magnetic contact end toward said magnetic contact structure on gravity operation having said power-operated means isolated from said source of power, and for said power-operated means energized from said source of power to drive said magnetically conductive plunger means in a reverse direction on said axis thereof, and said axis of said magnetically conductive plunger means extends through said non-magnetic zone wherein said Hall effect wafer is in said magnetic flux path.

9. Magnetizing and residual magnetic flux sensitive apparatus as set forth in claim 8 wherein said power-operated means comprises a fluid-operated motor having a piston connected to move with said magnetically conductive plunger means as said magnetically conductive plunger means moves longitudinally axially.

References Cited
UNITED STATES PATENTS

| | | | |
|---|---|---|---|
| 2,295,382 | 9/1942 | Brace | 324—37 |
| 2,942,177 | 6/1960 | Neumann et al. | 324—37 |
| 3,016,487 | 1/1962 | Foley | 324—38 |
| 3,281,666 | 10/1966 | Makino | 324—34 |

FOREIGN PATENTS

| | | |
|---|---|---|
| 866,570 | 4/1961 | Great Britain. |
| 936,015 | 9/1963 | Great Britain. |
| 155,541 | 1963 | U.S.S.R. |
| 1,403,958 | 5/1965 | France. |

OTHER REFERENCES

Diamond; Milton J.; Hardness Tester Sorts Auto Engine Parts; Electronics; December 1954, pp. 160–161.

RUDOLPH V. ROLINEC, Primary Examiner

R. J. CORCORAN, Assistant Examiner

U.S. Cl. X.R.

317—157.5; 335—284